(12) United States Patent
Regen et al.

(10) Patent No.: US 12,545,880 B2
(45) Date of Patent: Feb. 10, 2026

(54) DEVICE FOR MECHANICALLY STABILIZING A CONNECTION, IN PARTICULAR A SENSOR CONNECTION, ON A FLEXIBLE BAG

(71) Applicant: Sartorius Stedim Biotech GmbH, Goettingen (DE)

(72) Inventors: Thomas Regen, Goettingen (DE); Jochen Scholz, Goettingen (DE); Thomas Dreher, Goettingen (DE); Regina Wollschmidt, Goettingen (DE); Sascha Gaertner, Goettingen (DE); Jan-Eike Schubert, Goettingen (DE); Ute Husemann, Goettingen (DE); Sabrina Hildebrandt, Goettingen (DE); Andrea Frieser, Goettingen (DE); Sharon-Angela Althuber, Goettingen (DE); Sebastian Purmann, Goettingen (DE)

(73) Assignee: SARTORIUS STEDIM BIOTECH GMBH (DE)

( * ) Notice: Subject to any disclaimer, the term of this patent is extended or adjusted under 35 U.S.C. 154(b) by 974 days.

(21) Appl. No.: 17/606,109

(22) PCT Filed: Apr. 15, 2020

(86) PCT No.: PCT/EP2020/060602
§ 371 (c)(1),
(2) Date: Oct. 25, 2021

(87) PCT Pub. No.: WO2020/216660
PCT Pub. Date: Oct. 29, 2020

(65) Prior Publication Data
US 2022/0195372 A1 Jun. 23, 2022

(30) Foreign Application Priority Data
Apr. 25, 2019 (DE) .................... 10 2019 110 742.3

(51) Int. Cl.
*C12M 1/12* (2006.01)
*C12M 1/00* (2006.01)

(52) U.S. Cl.
CPC ............ *C12M 37/04* (2013.01); *C12M 23/14* (2013.01); *C12M 23/28* (2013.01); *C12M 23/38* (2013.01)

(58) Field of Classification Search
None
See application file for complete search history.

(56) References Cited

U.S. PATENT DOCUMENTS 5,736,398 A * 4/1998 Giambernardi ........ C12M 23/24
435/288.1
8,252,582 B2 8/2012 Baumfalk et al.
(Continued)

FOREIGN PATENT DOCUMENTS

DE 102016120699 B3 3/2018
EP 2024487 B1 8/2011
(Continued)

OTHER PUBLICATIONS

International Search Report issued in International Application No. PCT/EP2020/060602, issued Aug. 28, 2020, 3 pages.

*Primary Examiner* — Michael A Marcheschi
*Assistant Examiner* — Ashley Lopezlira
(74) *Attorney, Agent, or Firm* — Dilworth IP, LLC (57) ABSTRACT

A device for mechanically stabilizing a sensor port on a flexible bag including a rigid, substantially plate-shaped support part, which has a receptacle for a rigid connecting part integrated in the bag, in particular a sensor, and a holding mechanism on the receptacle. The device further includes a fastening element adapted to be attached to the holding mechanism of the support part such that it fixes the support part to the connecting part. The device may include a rigid support part which can be assembled from at least (Continued)

two parts, preferably struts. The parts surround a free area or an opening in which a rigid connecting part integrated in the bag can be placed. In an assembled state of the parts, the free area or the opening has a smaller diameter than the connecting part, so that the parts form a load-receiving mechanism for the connecting part.

11 Claims, 6 Drawing Sheets

(56) References Cited

U.S. PATENT DOCUMENTS

| | | | | |
|---|---|---|---|---|
| 2009/0075362 | A1* | 3/2009 | Baumfalk | C12M 41/00 |
| | | | | 435/289.1 |
| 2012/0301954 | A1* | 11/2012 | Ehring | C12M 27/16 |
| | | | | 220/735 |
| 2013/0145818 | A1* | 6/2013 | Allgauer | C12M 23/00 |
| | | | | 73/431 |
| 2016/0298068 | A1* | 10/2016 | Schumacher | C12M 41/26 |
| 2017/0166852 | A1* | 6/2017 | Feng | C12M 41/26 |
| 2018/0104147 | A1* | 4/2018 | Ware | C12M 99/00 |
| 2019/0031996 | A1 | 1/2019 | Topp-Manske et al. | |

FOREIGN PATENT DOCUMENTS

| | | |
|---|---|---|
| EP | 2607474 A1 | 6/2013 |
| EP | 3199616 A1 | 8/2017 |
| WO | 2004039949 A2 | 5/2004 |
| WO | 2017211435 A1 | 12/2017 |

* cited by examiner

DEVICE FOR MECHANICALLY STABILIZING A CONNECTION, IN PARTICULAR A SENSOR CONNECTION, ON A FLEXIBLE BAG

This application is a national stage application under 35 U.S.C. § 371 of PCT Application PCT/EP2020/060602, filed Apr. 15, 2020; which claims benefit to German Patent Application DE 10 2019 110 742.3, filed Apr. 15, 2019; said applications incorporated herein by reference.

FIELD OF THE INVENTION

The invention relates to a device for mechanically stabilizing a port, in particular a sensor port, on a flexible bag, such as a disposable bioreactor.

BACKGROUND OF THE INVENTION

In disposable bioreactors or other flexible disposable bags such as those used in disposable mixing systems or disposable storage systems in the biopharmaceutical field, sensors are essential for data recording, monitoring, or controlling of the process taking place therein. These may be, for example, pH probes, $pO_2$ probes, or sensors for determining the cell number. The sensors—or at least essential parts thereof—are often integrated in the bag wall as disposable components by means of plastic ports, or the sensors are attached directly to the bag wall, in particular by welding or gluing. While the part of such a sensor responsible for the acquisition of measured values is located on the side facing the inside of the bag, the ports required for the operation of the sensor are provided on the rear side facing outwards. These may be electrical, optical, fluid, or other ports.

Usually, a flexible disposable bag is placed in a rigid container, typically made of stainless steel, before the start of a process, so that during and after filling with a medium, the bag comes to rest against and is supported by the inner wall of the outer container due to the hydrostatic pressure. The outer container has a window opening at the point opposite the sensor integrated in the bag wall so that the sensor, in particular the rear ports thereof, is accessible from the outside. However, in the area of the window opening, the outer container cannot perform any support function for the bag. The bag wall is therefore particularly vulnerable in the area around the integrated sensor, as the filled bag is partially pressed out of the window opening and is thus exposed to a particularly high load. However, it is essential to prevent the bag from tearing open and medium escaping from the bag in an uncontrolled manner.

SUMMARY OF THE INVENTION

The object of the invention is to enable a stabilization of a flexible bag in the area of a sensor integrated in the bag wall by means of a device which is cost-effective and easy to handle.

According to a first aspect of the invention, this object is achieved by a device for mechanically stabilizing a port, in particular a sensor port, on a flexible bag having a rigid, substantially plate-shaped support part, which has a receptacle for a rigid connecting part integrated in the bag, in particular a sensor, and a holding means on the receptacle, and a fastening element which is adapted to be attached to the holding means of the support part such that it thus fixes the support part to the connecting part received in the receptacle. Advantageous and useful configurations of this stabilizing device according to the invention are specified in the associated subclaims.

The device according to the invention serves for mechanically stabilizing a port, in particular a sensor port, on a flexible bag and, according to the first aspect, comprises a rigid, substantially plate-shaped support part which has a receptacle for a rigid connecting part integrated in the bag, in particular a sensor, and a holding means on the receptacle. The device according to the invention further comprises a fastening element which is adapted to be attached to the holding means of the support part such that it thus fixes the support part to the connecting part received in the receptacle.

At least in connection with the support part according to the invention and the connecting part, "rigid"—in contrast to a flexible bag—is to be understood to mean a substantially solid, kink- and break-resistant material, which however does not necessarily have to be completely non-deformable, but may have a certain flexibility.

The invention is based on the basic idea that the endangered area of the flexible bag with the port, which could be pressed out of the window opening of the surrounding rigid container, can be stabilized by a rigid plate. The support part of the device according to the invention enables exactly this by being supported at least on opposite edges of the window opening and thus relieving the endangered area of the bag. The support part is automatically pressed against the edges of the window opening by the medium contained in the flexible bag and pushing outwards due to the force of gravity and the spatial limitations. Additional measures for fixing the support part to the window opening are therefore not necessary.

A characteristic feature of the stabilizing device according to the invention is the combination of the support part and the fastening element which fixes the support part on the outer wall of the bag. More specifically, the fastening element establishes a connection to the connecting part integrated in the bag such that the support part is clamped and held in position between the connecting part in the wall of the bag and the fastening element. This results in a preassembled storable and transportable unit, i.e., the support part need not be supplied separately from the bag and be placed at the correct location (and in the correct orientation, if required) by the user. This also means that the fastening of the support part prior or during filling of the bag cannot be forgotten.

According to a particularly simple embodiment, the receptacle of the support part for the connecting part integrated in the bag is substantially formed by an opening in the support part. The shape and dimensions of the connecting part and the opening should be matched to each other. As a large number of the connecting parts integrated in flexible bags (sensors, connectors, etc.) have predetermined standard shapes and dimensions, it is in these cases not necessary to specifically assign support parts to connectors in advance, since the support part can be used flexibly.

The fastening element of the device according to the invention may be a clamp or the like. According to a preferred embodiment, however, the fastening element is a cap which can be attached to the holding means of the support part by rotation. The design as a cap has the advantage that after attaching the cap, i.e., in the mounted state of the device, the connecting part arranged there below is protected by the cap. This is particularly important for sensitive sensors.

Preferably, the connection between the fastening element and the support part is created with the aid of a rotary closure, in which the fastening element has radially projecting sections which can be placed in suitable receiving areas of the holding means and then clamped in covered receiving areas of the holding means by rotating the fastening element. The corresponding rotational positions ("open" and "closed") of the fastening element can then be clearly marked on the support part to prevent inadvertent incomplete attachment.

An effective clamping connection between the fastening element and the holding means can be easily achieved by ramp-shaped sections on the radially projecting sections of the fastening element or on the receiving areas of the holding means.

To ensure that the attachment of the fastening element simultaneously also produces a bond between the support part and the connecting part or the bag, it is provided in a preferred embodiment that the fastening element and the connecting part or a holder which is firmly connected to the sensor and/or the bag have matching functional sections which cooperate such that the fastening element is held on the connecting part or the holder when the fastening element is attached to the support part.

These functional sections can in particular be formed by matching threads on the fastening element and on the connecting part or the holder, respectively. The threads have the advantage that the fastening element is connected both to the support element and to the sensor or the holder by a simple rotational movement.

Alternatively, the functional sections may be formed by matching clamping sections and clamping areas on the fastening element and on the connecting part or the holder, respectively.

For easier handling, the fastening element may have a projecting gripping section and/or a profiled, i.e., nonskid surface.

According to a second aspect, the object of the invention is achieved by a device for mechanically stabilizing a port, in particular a sensor port, on a flexible bag having a rigid support part which can be assembled from at least two parts, preferably struts, the parts surrounding a free area or an opening in which a rigid connecting part integrated in the bag, in particular a sensor, can be placed, the free area or the openings, in an assembled state of the parts, having a smaller diameter than the connecting part, so that the parts form a load-receiving means for the connecting part. Advantageous and useful embodiments of this stabilizing device according to the invention are specified in the associated subclaims.

The device according to the invention serves to mechanically stabilize a port, in particular a sensor port, on a flexible bag and comprises, according to the second aspect, a rigid support part which can be assembled from at least two parts, preferably struts. The parts surround a free area or an opening in which a rigid connecting part integrated in the bag, in particular a sensor, can be placed. In the assembled state of the parts, the free area or opening has a smaller diameter than the connecting part, so that the parts form a load-receiving means for the connecting part.

According to the second aspect, the stabilizing device according to the invention is characterized by its simple structure, which does not require a separate fastening element, and its easy handling. Otherwise, it offers substantially the same advantages as the device according to the first aspect.

In a preferred embodiment of the device according to the invention, the parts in the assembled state form a substantially U-shaped support part. The longitudinal legs and, if applicable, the section of the support part connecting the legs can be easily pushed behind the connecting part, i.e., in the preferred application the sensor, to thus form the load-receiving means.

To make the assembly of the parts particularly easy and safe, the parts can be connected by means of a coupling element, for example a pin or the like. A section of the coupling element projects from one of the parts forming the support part and is adapted to be inserted into an opening provided on another part of the support part and matched to the projecting section of the coupling element.

According to a preferred design of the support part, an underside of the parts from which the support part is formed has a receptacle matched to the shape of the connecting part. This gives the user a defined positioning of the parts when pushing them together, and the connecting part (sensor) cannot easily slip off the support part.

According to a further advantageous design, the support part has flattened projections at opposite ends. The flattened projections are provided to engage behind opposite edge sections of a window opening in a rigid container in which the bag is received during a process. The spaces of the opposite projections are matched to the corresponding dimension of the window opening, such that a positioning of the support part or the parts thereof is achieved, which is unambiguous in this respect for the user. If the support part is composed of several parts, these can still be pushed together in a transverse direction after the arrangement thereof which is determined by the projections, to form the final load-receiving means for the connecting part (sensor).

Particularly advantageous is an embodiment of the device according to the invention in which both the support part and the fastening element are designed as disposable components and are made of a sterilizable plastic. Thus, the device according to the invention can be installed in advance on a disposable bag, and the entire group can be sterilized simultaneously in one step before its delivery, in particular by gamma radiation.

However, the support part can also be designed as a reusable component. In this case, it is preferably adapted to be assembled and disassembled several times, so that it is possible to mount it on a sensor or other connecting part and to removed it therefrom several times.

The invention also provides a device arrangement comprising a flexible bag, a rigid connecting part integrated in a wall of the bag, and a stabilizing device as defined above according to the first aspect or the second aspect. The entire device arrangement may be packaged, stored, and delivered as a unit. Errors on the part of the user in assembling prior to putting the bag into service are thus eliminated.

In the preferred application of the invention, the bag is received in and supported by a rigid container. The rigid container has a window opening through which the connecting part integrated in the bag is accessible.

To ensure an optimum hold of the support part in the event that the inner wall of the container does not have a smooth or uniform contour in the area of the window opening, the support part preferably has a shape which is adapted to this contour.

According to the preferred application of the invention, the flexible bag is a disposable bioreactor, and the connecting part is a sensor.

It is particularly advantageous for the user if as few cleaning operations as possible need to be carried out and as few components as possible need to be sterilized in a process set-up. Therefore, in a preferred embodiment, the invention provides that the bag, the connecting part, and the stabilizing device are designed as sterilizable disposable components.

Thus, the entire device arrangement according to the invention (flexible bag, connecting part integrated in the wall of the bag, and stabilizing device with the support part and the fastening element) can be delivered to the user as a pre-assembled and pre-sterilized unit.

BRIEF DESCRIPTION OF THE DRAWINGS

Further features and advantages of the invention will become apparent from the description below and from the accompanying drawings to which reference is made and in which.

DETAILED DESCRIPTION OF THE INVENTION

FIGS. 1 to 4 show an exemplary first embodiment of a device 10 which is provided for stabilizing a port, in this case a sensor port, which is integrated in the wall of a flexible bag, in particular a disposable bioreactor.

The stabilizing device 10 comprises a rigid, kink- and break-resistant support part 12 in the form of a comparatively thin plate having a receptacle for a sensor 14 (not shown in FIG. 1) intended for use in the bioreactor. The support part 12 consists of a stable plastic or another suitable sterilizable material.

The receptacle for the sensor 14 is substantially formed by an opening 16 in the support part 12. In the example embodiment shown, the opening 16 is circular and has a slightly larger diameter than the sensor 14, which is also circular and generally substantially disc-shaped. In general, the shape and dimensions of the sensor 14 and the opening 16 are matched to each other such that the sensor 14 has no play at all or no large play in the opening 16 (see FIG. 2).

On a first side of the plate-shaped support part 12, the opening 16 is surrounded by a projecting holding means 18, which here is made in one piece with the support part 12. The holding means 18 serves to receive and retain a fastening element 20, which is designed here as a (screw) cap. The diameter of the fastening element 20 is larger than that of the opening 16 in the support part 12. The fastening element 20 is also made of a stable plastic or another suitable sterilizable material.

To receive and retain the fastening element 20 on the support part 12, the holding means 18 thereof and the fastening element 20 may have matching threads so that the fastening element 20 can be screwed tightly on the support part 12.

However, in the example embodiments illustrated in FIGS. 1 to 6, a rotary closure is provided in which, in one or more defined rotational positions of the fastening element 20, sections 22 projecting radially from the fastening element 20 can be placed in matching upwardly open receiving areas 24 of the holding means 18 and then clamped in covered receiving areas 26 by rotating the fastening element 20 through a predetermined angle. In addition, a stop may be provided which gives haptic feedback to the user and prevents over-tightening.

In an extended design, this fastening concept can also be designed with ramp-shaped sections on the fastening element 20 and/or on the receiving areas 24 in the manner of a bayonet mount.

On its inner side, the fastening element 20 has an internal thread which is matched to an external thread of the sensor 14, as will be explained in more detail below.

For an easier handling, the fastening element 20 has a projecting gripping section 28 (FIG. 1) or a profiled surface (FIG. 5) so that a user can easily grip the fastening element 20 and rotate it in the holding means 18.

In the following, the handling and the function of the stabilizing device 10 are described on the basis of a concrete example with a bioreactor as a bag and a sensor 14 as a connecting part.

A prerequisite for the use of the stabilizing device 10 in this case is a sensor 14 which is already integrated, in particular welded in a flexible disposable bag 30. The sensor 14 is incorporated in a wall of the bag 30 such that its front side with the measurement-sensitive part which is to come into contact with or at least face the medium in the bag 30 faces the inside of the bag, while its rear side 34 with electrical, optical, or other required ports 36 faces the outside. It is of course necessary to ensure that the bag 30 is completely sealed in the area of the sensor 14.

Figure 1:
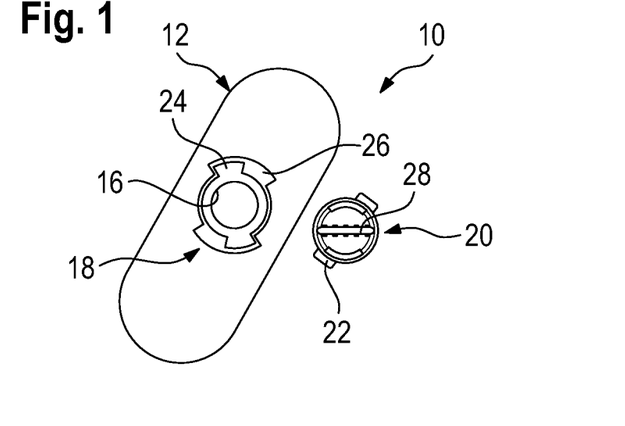
FIG. 1 shows a top view of the individual parts of the device according to the invention for the mechanical stabilization of a sensor port according to a first embodiment.
Figure 2:
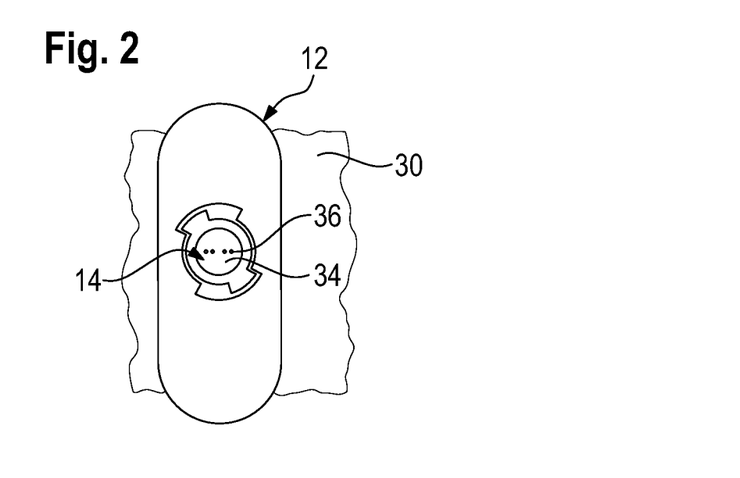
FIG. 2 shows a top view of the support part of the device according to the invention of FIG. 1, which is placed on a sensor integrated in a bag.
Figure 3:
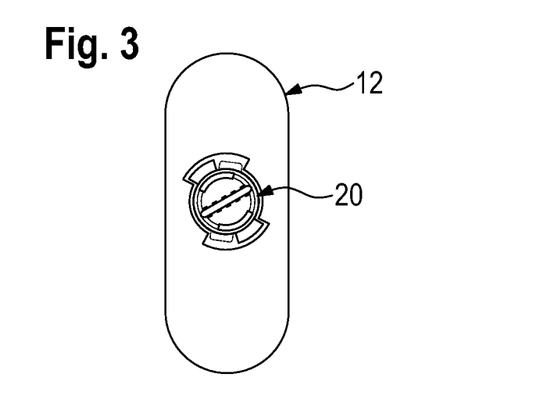
FIG. 3 shows a top view of the device according to the invention of FIG. 1 in the transportable state.
Figure 4:
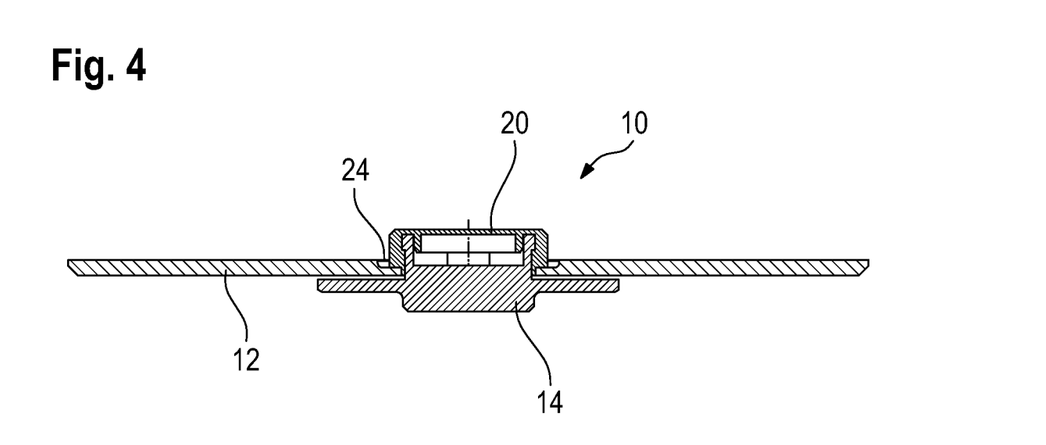
FIG. 4 shows a sectional view of the device according to the invention of FIG. 1 in the transportable state.

As shown in FIG. 2, the support part 12 is placed on the outer wall of the bag 30 such that the underside of the support part 12 opposite the upper side with the holding means 18 faces the outer wall of the bag and the sensor 14 projects into the opening 16 of the support part 12 with its rear side 34 facing upwards. The support part 12 should be brought into the desired orientation (rotational position) relative to the bag wall, if this is of importance for later use. Depending on the fastening concept, the fastening element 20 is then attached to the holding means 18 of the support part 12 by screwing, turning, clamping or the like.

In the example embodiments shown in FIGS. 1 to 6, the rotation of the fastening element 20 in the holding means 18 simultaneously establishes a connection between the rigid sensor 14 and the fastening element 20. This connection is achieved by the matching threads of the fastening element 20 and the sensor 14. More specifically, by rotating the fastening element 20, the internal thread thereof engages the external thread of the sensor 14 so that, once the fastening element 20 is attached, the bag 30 with the sensor 14 and the support part 12 with the fastening element 20 form a unit, the support part 12 being held in the desired orientation relative to the bag wall (see FIG. 4).

A design is also possible in which, after having placed the support part 12 on the bag 30, the fastening element 20 is first screwed onto the sensor 14 by several turns. The fastening element 20 is screwed on until the sections 22 projecting radially from the fastening element 20 enter the matching receiving areas 24 of the holding means 18 and are then clamped into the covered receiving areas 26 by a final rotation of the fastening element 20 through a specific angle.

The external thread does not necessarily have to be provided on the sensor 14 itself, but may alternatively be formed on a holder firmly connected to the sensor 14 and/or the bag 30.

The stabilizing device 10, including the support part 12 and the fastening element 20, may be pre-sterilized and packaged and delivered to a user in a sterilized state prior to its intended use. Typically, the stabilizing device 10 is pre-attached to the sensor 14 integrated in the flexible disposable bag 30, and the bag 30 is packaged and delivered together with the stabilizing device 10. Since the sensor 14 is also designed as a disposable component, the entire unit (the bag 30 with the sensor 14 and the stabilizing device 10 with the support part 12 and the fastening element 20) can be sterilized before packaging or shortly before use at the user's premises, in particular by gamma radiation.

Figure 5:
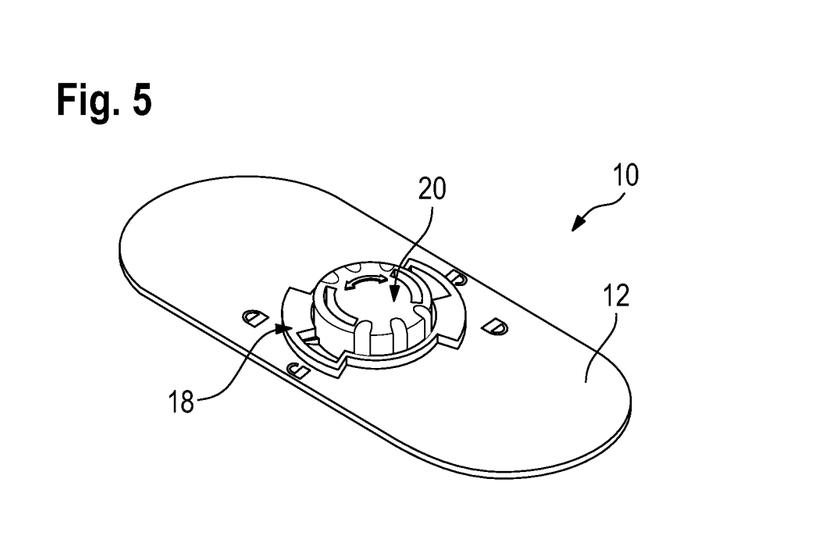
FIG. 5 shows a perspective view of the device according to the invention in a second embodiment in the transportable state.
Figure 6:
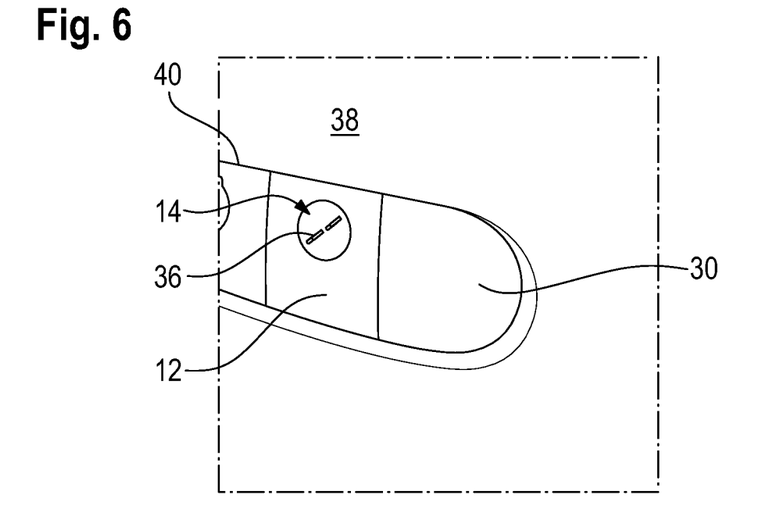
FIG. 6 shows a detail of a rigid container with a flexible bioreactor received therein along with the device according to the invention of FIG. 1 without the fastening element.

In the second embodiment shown in FIG. 5, the support part 12 of the stabilizing device 10 can be seen in use. A disposable bioreactor configured as a flexible plastic bag 30 and filled with a medium is received in and held and supported by a rigid reusable container 38 made of stainless steel or any other suitable material. The outer container 38 has a window opening 40 through which a certain section of the outer wall of the bioreactor is visible and accessible. The sensor 14 integrated in the bioreactor wall with the stabilization device 10 is located precisely in this area. The shape and dimensions of the window opening 40 and the support part 12 are matched to each other such that the support part 12 can be supported at its outer areas with a sufficiently large support surface on the inner wall of the outer container 38 surrounding the window opening 40. The material and thickness of the support part 12 are selected such that the support part 12 does not bend or bends only insignificantly in the area of the window opening 40 due to the pressure of the medium in the flexible disposable bioreactor, but under no circumstances does it bend or break. The stabilizing device 10, more specifically the support part 12, thus ensures that the flexible wall of the bioreactor is relieved in the area of the sensor 14, so that a passage of the bag wall through the window 40 or damage to the bioreactor in this vulnerable area is avoided.

The sensor 14 can be put into operation by removing the fastening element 20 and making the necessary connections, e.g., for the measurement electronics. This is possible because the sensor area of the bioreactor is accessible through the window opening 40 in the outer container 38. The medium in the bioreactor presses the wall thereof against the inner wall of the outer container 38, so that the support part 12 remains in the desired position at the window opening 40 and does not slip or become detached from the sensor 14.

Figure 7:
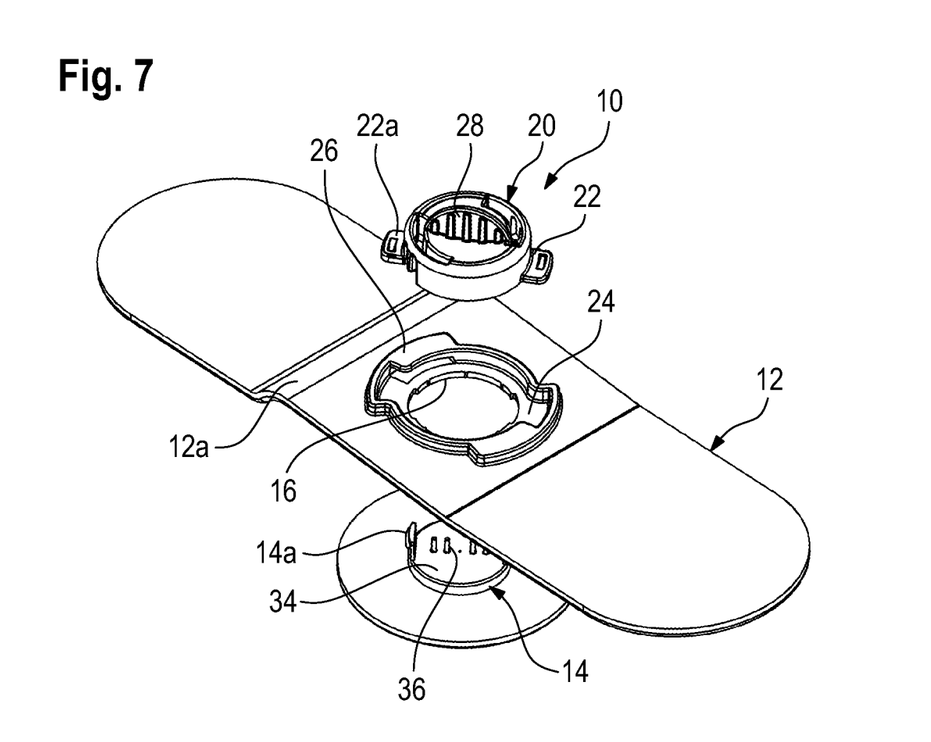
FIG. 7 shows a perspective view of the individual parts of the device according to the invention in a third embodiment.
Figure 8:
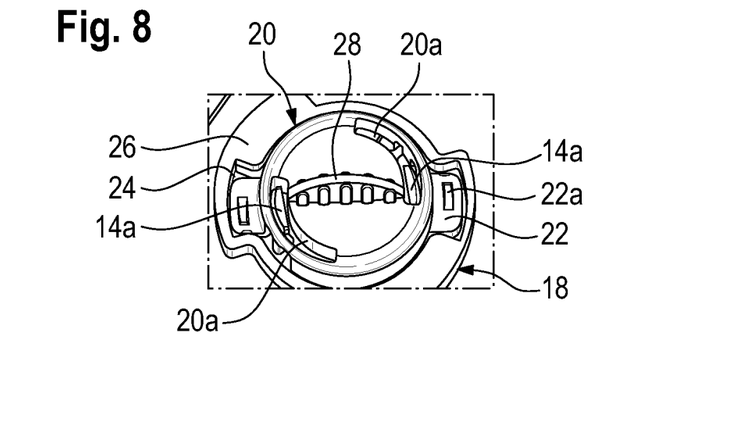
FIG. 8 shows a detailed perspective view of the device of FIG. 7 in a first rotational position of the fastening element.
Figure 9:
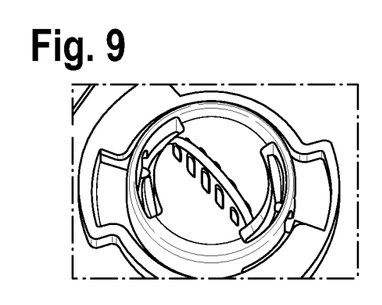
FIG. 9 shows a detailed perspective view of the device of FIG. 7 in a second rotational position of the fastening element.

FIGS. 7 to 9 show a slightly differently designed third embodiment of the stabilizing device 10. This embodiment differs in the shape of the support part 12 and in the way the fastening element 20 is locked.

The support part 12 is also substantially plate-shaped here, but not completely flat. Rather, the support part 12 has a curved shape which is adapted to a corresponding contour of the inner wall of the outer container 38 in the area of the window opening 40. As can be seen in FIG. 7, the support part 12 has an arcuate section 12a. Other shapes are of course also possible to compensate for any unevenness of the inner wall of the container in the area of the window opening 40. An overall curved shape is also possible.

Furthermore, a special bayonet locking is provided for the fastening element 20. As previously described, in a defined first rotational position of the fastening element 20, the radially projecting sections 22 are placed in matching, upwardly open receiving areas 24 of the holding means 18 and are subsequently clamped in covered receiving areas 26 by rotating the fastening element 20 through a certain angle into a second rotational position. The clamping action between the fastening element 20 and the holding means 18 of the support part 12 is achieved here by ramp-shaped sections 22a on the projecting sections 22. For easier handling, the fastening element 20 here has a projecting gripping section 28, which additionally has a profiled surface.

However, the fastening element 20 does not have an internal thread on its inner side, nor does the sensor 14 have an external thread. Instead, on its rear side 34 facing away from the inside of the bag, the sensor 14 has a plurality (here two opposite) projecting clamping sections 14a, 14b which can be deflected elastically. These clamping sections 14a, 14b are matched with clamping areas 20a, 20b of the fastening element 20, so that in the second rotational position of the fastening element 20, a clamping connection is also established between the fastening element 20 and the sensor 14.

Figure 10:
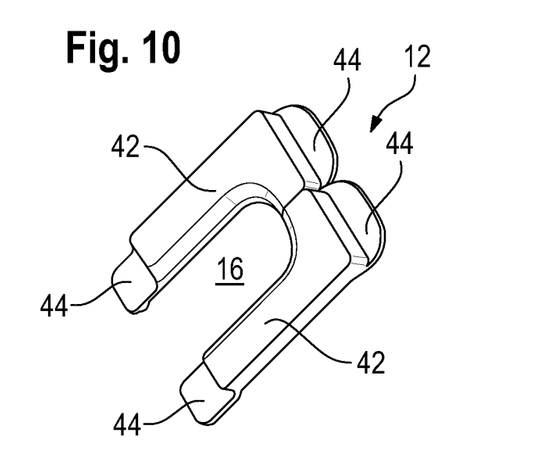
FIG. 10 shows a perspective view of the upper side of a support part of the device according to the invention in a fourth embodiment.
Figure 11:
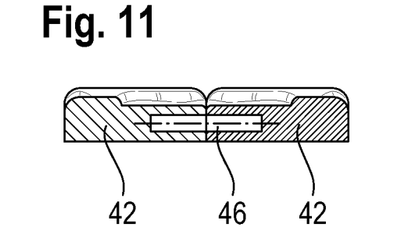
FIG. 11 shows a lateral sectional view of the support part of FIG. 10.
Figure 12:
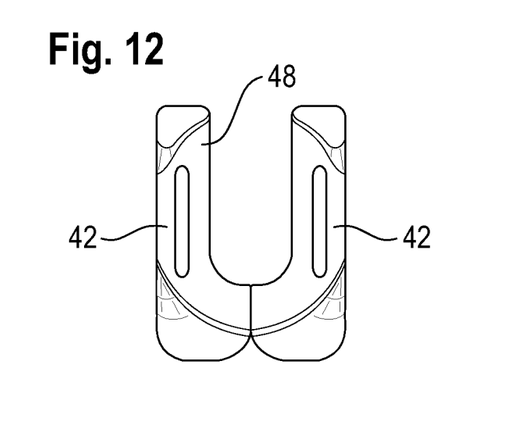
FIG. 12 shows a view of the underside of the support part of FIG. 10.
Figure 13:
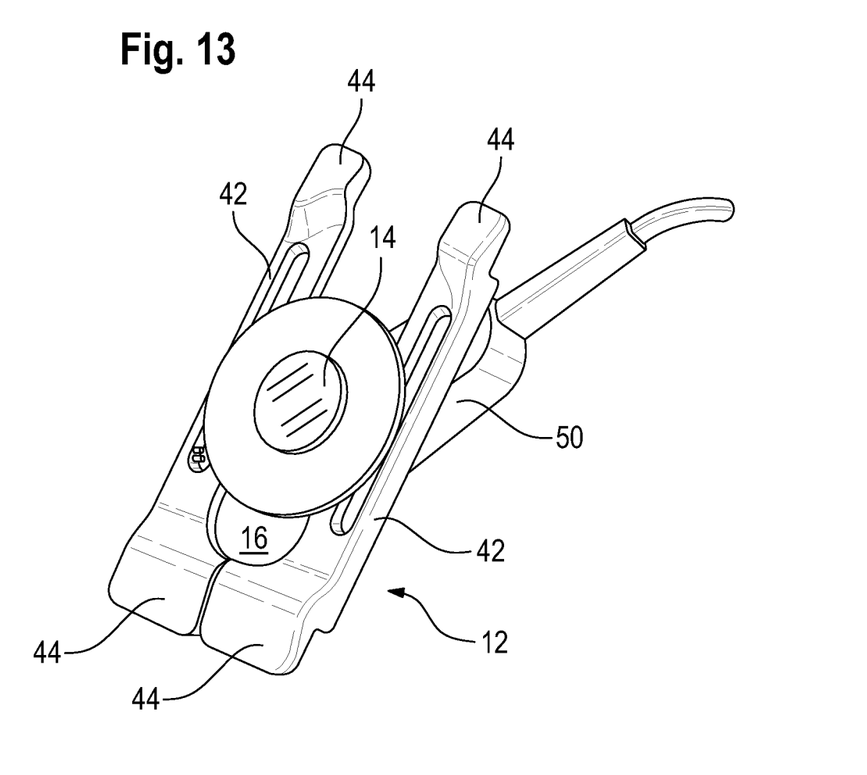
FIG. 13 shows a perspective view of the entire device according to the invention in the fourth embodiment.

FIGS. 10 to 12 show a fourth embodiment of the support part 12 which is intended for multiple use, i.e., this support part 12 is not necessarily designed as a disposable component. This embodiment, which is shown in FIG. 13 as a whole in the fully assembled state with a sensor 14 and a connecting element 50, does not require a separate fastening element.

In the fourth embodiment, the support part 12 consists of at least two individual parts, here in particular in the form of two struts 42, which, when assembled, form a substantially U-shaped form. When assembled, the parts can also have the shape of a ring or the like, as long as there is a free area or an opening 16 in the middle having a diameter which is smaller than the diameter of the sensor 14 or the holder thereof.

The load-receiving struts 42 can be made of robust plastics, e.g., PEEK (polyether ether ketone), but also of metal.

In FIG. 10, it can be seen that the struts 42 each have a step at their longitudinal ends on the upper side, i.e., the struts 42 have flattened projections 44 at their longitudinal ends. The longitudinal extension of the struts 42 between the steps, i.e., without the projections 44, corresponds to a dimension of the window opening 40 in the container 38, preferably the vertical dimension of the window opening 40.

As can be seen in FIG. 11, the two struts 42 are connected to each other by a coupling element 46, such as a pin or a guide rail. The coupling element 46 is attached to and projects from one of the two struts 42. The other strut 42 has an opening matching with the coupling element 46, so that when the two struts 42 are plugged together, the projecting section of the coupling element 46 is inserted into the opening, thus ensuring that the struts 42 adopt the correct mounting position shown in FIGS. 10 to 12.

The underside of the struts 42 shown in FIG. 12 has deepened or recessed areas shaped to form a receptacle 48 (here substantially circular) matching with the shape of the sensor 14 or the holder thereof when the struts 42 are assembled together (mounting position).

In contrast to a one-piece design, multiple attachment and removal of the support part 12 to or from an installed sensor 14 or the holder thereof on the bag 14 is possible as the struts 14 can be assembled and disassembled several times.

Referring to FIGS. 14 to 17, the installation of the support part 12 according to the fourth embodiment is described below by way of example.

Figure 14:
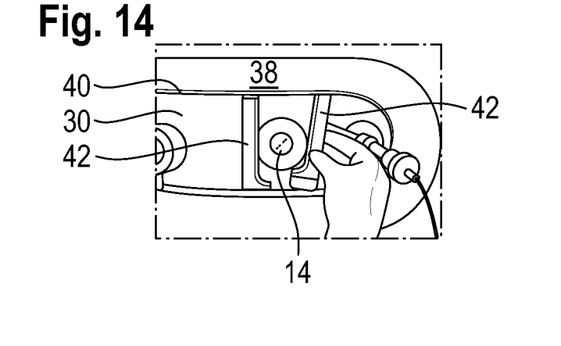
FIGS. 14 to 17 show successive steps for the installation of the device according to the fourth embodiment.

The disposable bioreactor, designed as a flexible plastic bag 30 and received in the rigid, reusable container 38 made of stainless steel or another suitable material, is filled to a predetermined minimum volume with the medium intended for the process to be carried out (e.g., cell cultivation). The bioreactor is placed such that the sensor 14 integrated in the bioreactor wall is located in the area of the window opening 40 of the container 38.

As shown in FIG. 14, the two struts 42 are clamped individually between the edge of the window opening 40 and the outer wall of the bioreactor. The struts 42 are positioned on opposite sides of the sensor 14 (here on the left and the right of the sensor 14). The upper side of the struts 42 faces outwards, i.e., the flat and smooth underside of the struts 42, with the exception of the deepened areas, rests against the outer wall of the bioreactor so that the bioreactor cannot be damaged. The projections 44 of the struts 42 engage behind the edge of the window opening 40, while the thicker middle sections of the struts 42 can be easily grasped by the user in the area of the window opening 40.

Figure 15:
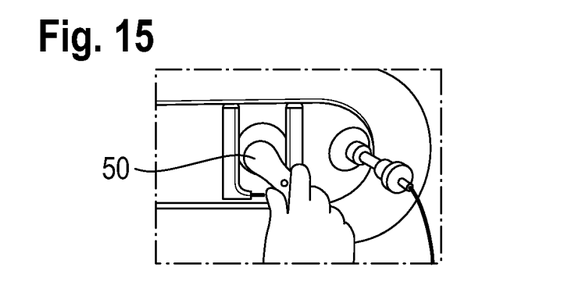

The necessary connections, e.g., for the measuring electronics, are then made (see FIG. 15). In the example shown, a connecting element 50 in the form of a pre-amplifier is plugged onto the rear side of the sensor 14 or attached in any other way.

Figure 16:
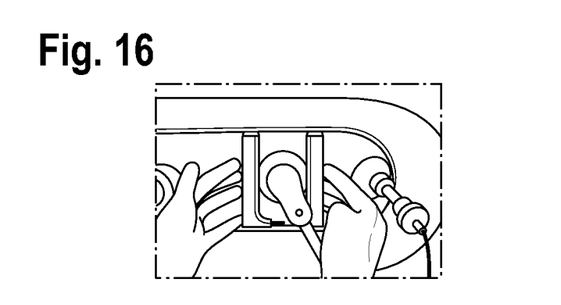

The support part 12 is then transferred to its mounting position by pushing the two struts 42 together, as shown in FIG. 16, until the projecting part of the connecting element 44 of one strut 42 is fully inserted into the associated opening of the other strut 42. The deepened or recessed areas on the underside of the struts 42 make it easier for the user to slide the struts 42 over the edge of the sensor 14 or the holder thereof. After having pushed them together, the sensor 14 or the holder thereof is completely in the receptacle 48.

Figure 17:
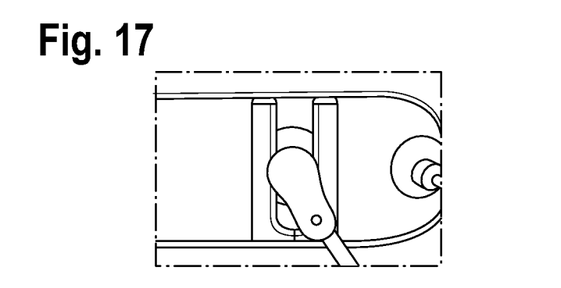

The final mounting state can be seen in FIG. 17. The bioreactor can now be further filled with medium up to the desired working volume. The additional medium presses the sensor 14 or the holder thereof even more firmly against the support part 12, which takes up a large amount of the load and transfers it to the container 38. Due to the support part 12 being pressed against the edge of the window opening 40, and in particular the receptacle 38 thereof, the sensor 14 is fixed and cannot slip.

If necessary, the connecting element 50 can also be attached to the sensor 14 only after the support part 12 has been fully assembled.

The disassembly of the support element 12 is carried out substantially in the reverse order of the installation steps described above.

Support members 12 may be provided in a plurality of sizes or shapes, in particular adapted to standardized or typical sizes and shapes of sensors 14 and window openings 40.

Of course, certain features of the embodiments described above may be combined in a suitable way.

The stabilizing device 10 is suitable not only for bioreactors, but in principle for all flexible disposable bags having integrated sensors 14, such as are also used in disposable mixing systems or disposable storage systems, for example. Furthermore, the stabilizing device 10 is not only suitable for sensor ports, but also for other ports, for example hose or connector ports, which are integrated in a flexible bag 30. The accommodation of the support part 12 is then not adapted to the shape and dimensions of a sensor 14, but of another rigid connecting part.

LIST OF REFERENCE NUMERALS

10 stabilizing device
12 support part
12a arcuate section of the support part
14 sensor
14a clamping sections of the sensor
16 opening in the support part
18 holding means of the support part
20 fastening element
20a clamping areas of the fastening element
22 projecting sections of the fastening element
22a ramp-shaped sections on the projecting sections
24 open receiving areas of the holding means
26 covered receiving areas of the holding means
28 gripping section of the fastening element
30 bag
34 rear side of the sensor
36 ports of the sensor
38 container
40 window opening of the container
42 struts
44 projections
46 coupling element
48 receptacle
50 connecting element

The invention claimed is:

1. A device for mechanically stabilizing a port on a flexible bag, comprising
   a rigid support part comprised of at least two parts, each of the at least two parts being rigid,
   the at least two parts, in an assembled state, together defining a free area or an opening therebetween to receive a rigid connecting part integrated in the flexible bag,
   the free area or the opening, in the assembled state of the at least two parts, having a smaller diameter than the connecting part, so that each of the at least two parts clamp around the connecting part from behind, on a side of the connecting part facing away from the flexible bag, to form a load-receiving mechanism for the connecting part,
   wherein the at least two parts are struts.

2. The device according to claim 1, characterized in that in the assembled state, the at least two parts form a substantially U-shaped support part.

3. The device according to claim 1, characterized in that the at least two parts are connected by a coupling element, a section of the coupling element projecting from one of the at least two parts and being adapted to be inserted into an opening provided on another one of the at least two parts and matched to the section of the coupling element.

4. The device according to claim 1, characterized in that an underside of the at least two parts has a receptacle matched to a shape of the connecting part.

5. The device according to claim 1, characterized in that the support part has flattened projections at opposite ends.

6. The device according to claim 1, characterized in that the support part is a reusable component configured to be assembled and disassembled several times.

7. The device according to claim 1, wherein the support part is on an outer wall of the bag when the connecting part is received in the opening.

8. A device arrangement, comprising a flexible bag, a rigid connecting part integrated in a wall of the bag, a rigid container in which the bag is received and by which the bag is supported, and the device for mechanically stabilizing a port according to claim 1, the rigid container having a window opening through which the connecting part integrated in the bag is accessible, the device for mechanically stabilizing a port being clamped between an edge of the window opening and an outer wall of the bag.

9. The device arrangement according to claim 8, characterized in that the support part has a shape which is adapted to a contour of an inner wall of the container in an area of the window opening.

10. The device arrangement according to claim 8, characterized in that the flexible bag is a disposable bioreactor and the connecting part is a sensor.

11. The device arrangement according to claim 8, characterized in that the bag, the connecting part and the stabilizing device are sterilizable disposable components.

* * * * *